United States Patent
Cellucci et al.

(10) Patent No.: US 12,488,055 B2
(45) Date of Patent: Dec. 2, 2025

(54) DATASET IDENTIFICATION FOR DATASETS WITH MULTIPLE IDENTIFICATION ATTRIBUTES

(71) Applicant: Capital One Services, LLC, McLean, VA (US)

(72) Inventors: Christopher Cellucci, Scotts Valley, CA (US); Selwyn Lehmann, Hughson, CA (US); Saianirudh Kantabathina, Fremont, CA (US); Samuel Joshua Bennett, Midlothian, VA (US); Alec Sokol, San Francisco, CA (US)

(73) Assignee: Capital One Services, LLC, McLean, VA (US)

( * ) Notice: Subject to any disclaimer, the term of this patent is extended or adjusted under 35 U.S.C. 154(b) by 151 days.

(21) Appl. No.: 18/472,565

(22) Filed: Sep. 22, 2023

(65) Prior Publication Data

US 2025/0103658 A1    Mar. 27, 2025

(51) Int. Cl.
*G06F 16/906* (2019.01)
*G06F 16/901* (2019.01)

(52) U.S. Cl.
CPC ........ *G06F 16/906* (2019.01); *G06F 16/9024* (2019.01)

(58) Field of Classification Search
CPC .......................... G06F 16/906; G06F 16/9024
See application file for complete search history.

(56) References Cited

U.S. PATENT DOCUMENTS

| 12,130,789 | B1 * | 10/2024 | Lin | G06F 16/219 |
| 2021/0357470 | A1 * | 11/2021 | James | G06F 16/2425 |
| 2024/0354374 | A1 * | 10/2024 | Shanmuganathan | G06F 16/24564 |

* cited by examiner

*Primary Examiner* — Charles Rones
*Assistant Examiner* — Xiaoqin Hu
(74) *Attorney, Agent, or Firm* — Harrity & Harrity, LLP

(57) ABSTRACT

In some implementations, a system may receive information identifying a dataset. The system may process an identification attribute using a function that generates a first value, to generate a first identifier for the dataset. The system may search a data store storing a plurality of groupings to identify a grouping with the first identifier for the dataset. The system may extract a second identifier from the grouping with the first identifier for the dataset. The system may search a data lineage based graph representation of a plurality of datasets to identify a graph node representing the dataset. The system may update the data lineage based graph representation of the plurality of datasets to link the dataset with the at least one other dataset based on searching the data lineage based graph representation of the plurality of datasets to identify the graph node.

20 Claims, 6 Drawing Sheets

DATASET IDENTIFICATION FOR DATASETS WITH MULTIPLE IDENTIFICATION ATTRIBUTES

BACKGROUND

In some data processing systems, data may be organized and stored in a structured format, such as a table or a hierarchical structure. However, structured formats may be inefficient for representing complex and interconnected data relationships. In such cases, a data processing system may use a graph representation of data. A graph representation is a data structure that includes nodes and edges. Each node may represent a discrete entity within the data and each edge may represent a relationship or connection between the discrete entities. Graph representations may enable efficient storage of information regarding complex and interconnected data relationships as well as efficient recall of information regarding the complex and interconnected data relationships.

SUMMARY

Some implementations described herein relate to a system for lineage-driven dataset identification. The system may include one or more memories and one or more processors communicatively coupled to the one or more memories. The one or more processors may be configured to receive information identifying a dataset with a plurality of identification attributes. The one or more processors may be configured to process the plurality of identification attributes, collectively, using a first function that generates a first value, to generate a first identifier for the dataset. The one or more processors may be configured to process the plurality of identification attributes, individually, using a second function that generates a plurality of second values, to generate a plurality of second identifiers for the dataset. The one or more processors may be configured to generate, based on processing the plurality of identification attributes collectively and individually, a plurality of groupings, wherein each grouping, of the plurality of groupings, includes the first identifier and a corresponding second identifier of the plurality of second identifiers. The one or more processors may be configured to add a graph node, for the dataset, to a data lineage based graph representation of a plurality of datasets, wherein the graph node is associated with the first identifier. The one or more processors may be configured to store, in a data store associated with the data lineage based graph representation of the plurality of datasets, information identifying the plurality of groupings.

Some implementations described herein relate to a method for lineage-driven dataset identification. The method may include receiving, by a system, information identifying a dataset, wherein the information identifying the dataset includes information identifying at least one other dataset linked to the data by a process. The method may include processing, by the system, an identification attribute using a function that generates a first value, to generate a first identifier for the dataset. The method may include searching, by the system, a data store storing a plurality of groupings to identify a grouping with the first identifier for the dataset. The method may include extracting, by the system, a second identifier from the grouping with the first identifier for the dataset. The method may include searching, by the system and using the second identifier, a data lineage based graph representation of a plurality of datasets to identify a graph node representing the dataset within the data lineage based graph representation of the plurality of datasets. The method may include updating, by the system, the data lineage based graph representation of the plurality of datasets to link the dataset with the at least one other dataset based on searching the data lineage based graph representation of the plurality of datasets to identify the graph node.

Some implementations described herein relate to a non-transitory computer-readable medium that stores a set of instructions. The set of instructions, when executed by one or more processors of a system, may cause the system to receive information identifying a dataset with a plurality of identification attributes. The set of instructions, when executed by one or more processors of the system, may cause the system to process the plurality of identification attributes, collectively, using a first function that generates a first value, to generate a first identifier for the dataset. The set of instructions, when executed by one or more processors of the system, may cause the system to process the plurality of identification attributes, individually, using a second function that generates a plurality of second values, to generate a plurality of second identifiers for the dataset. The set of instructions, when executed by one or more processors of the system, may cause the system to generate, based on processing the plurality of identification attributes collectively and individually, a plurality of groupings, wherein each grouping, of the plurality of groupings, includes the first identifier and a corresponding second identifier of the plurality of second identifiers. The set of instructions, when executed by one or more processors of the system, may cause the system to add a graph node, for the dataset, to a data lineage based graph representation of a plurality of datasets, wherein the graph node is associated with the first identifier. The set of instructions, when executed by one or more processors of the system, may cause the system to store, in a data store associated with the data lineage based graph representation of the plurality of datasets, information identifying the plurality of groupings. The set of instructions, when executed by one or more processors of the system, may cause the system to receive information identifying a lineage event, wherein the information identifying the lineage event includes at least one identification attribute of the plurality of identification attributes. The set of instructions, when executed by one or more processors of the system, may cause the system to process the at least one identification attribute using a third function to generate a third identifier. The set of instructions, when executed by one or more processors of the system, may cause the system to search the data store to identify at least one grouping that includes the third identifier. The set of instructions, when executed by one or more processors of the system, may cause the system to identify a node in the data lineage based graph representation using the at least one grouping. The set of instructions, when executed by one or more processors of the system, may cause the system to update the data lineage based graph representation based on the lineage event.

DETAILED DESCRIPTION

Figure 1A:
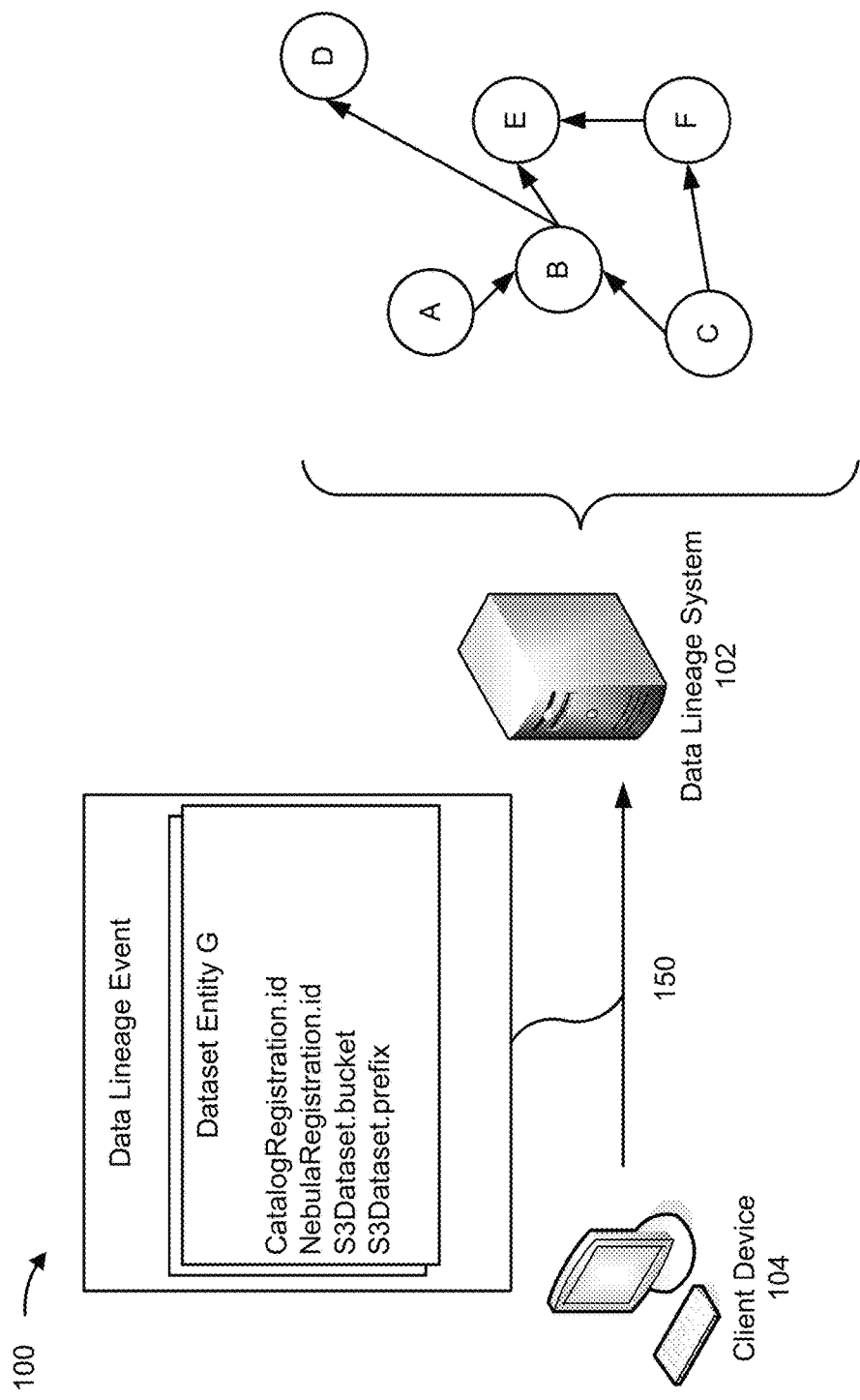
FIGS. 1A-1C are diagrams of an example implementation associated with dataset identification for datasets with multiple identification attributes, in accordance with some embodiments of the present disclosure.

The following detailed description of example implementations refers to the accompanying drawings. The same reference numbers in different drawings may identify the same or similar elements.

Data graphs include graph nodes and linkages (or edges) to represent entities within data and linkages between the entities. In an enterprise data lineage system, which includes a representation of a set of data processing tasks, processes, input datasets, and output datasets can be represented using a graph representation. In this case, the graph representation includes nodes that represent datasets that are input to or output from a set of data processing tasks. Further, the graph representation may include edges (or linkages) that represent connections between the datasets. For example, a first dataset, which is represented by a first node, can be processed by a processing task, which is represented by a linkage, and a result of the processing task is an output of a second dataset, which corresponds to a second node that is linked to the first node by the linkage.

However, some datasets may have multiple possible representations, such as a first representation associated with a metadata catalog registration identifier or a second representation associated with a set of attributes (e.g., a database name and a table name), among other examples. When information is identified for addition to the graph representation, such as via user submissions, parsing of newly connected applications (e.g., and processes and datasets associated therewith), or parsing of storage access logs, among other examples, new graph nodes and/or linkages may be generated to incorporate the information into the graph representation. However, the multiple possible representations of different datasets may result in duplication of datasets within the graph representation. Duplication of datasets (e.g., generation of duplicate nodes) can result in excessive storage utilization to store the graph representation.

Further, when duplicate nodes are generated for the same dataset, each of the duplicate nodes may have a different set of linkages to other nodes. In other words, a first graph node may have a first linkage to a second graph node, but when a duplicate of the first graph node is generated, the duplicate may be generated with a linkage to a third graph node. As a result, when a data processing system accesses the graph representation to determine characteristics of a single node, the data processing system may fail to identify characteristics represented by linkages that are only present on a duplicate node of the single node. In other words, the data processing system may determine that the first graph node is linked to the second graph node, but may not be able to determine that the first graph node is also linked to the third graph node, because the linkage to the third graph node is only present with the duplicate node.

Some implementations described herein enable graph node de-duplication for graph representations of datasets and linkages thereof. For example, a data lineage system may process a set of unique identifiers of a dataset, collectively, to generate a first identifier of the dataset and may process the set of unique identifiers of the dataset, individually, to generate a set of second identifiers of the dataset. In this case, as one example, the data lineage system may use a hash function to generate the identifiers. The data lineage system may store entries, in a data structure, that identify the first identifier, each second identifier of the dataset, and a graph node that has been generated for the dataset. As a result, when the data lineage system receives information identifying one of the unique identifiers of the dataset (e.g., a new submission of a new process that includes the dataset), the data lineage system can use a received unique identifier of the dataset to determine the graph node that represents the dataset and add a new linkage to an existing graph node, rather than generate a new, duplicate graph node. As a result, the data lineage system reduces data storage associated with a graph representation by reducing duplicate graph nodes. Additionally, or alternatively, the data lineage system eliminates redundant graph nodes, thereby improving an accuracy of information obtained from a graph representation (e.g., by avoiding duplicate graph nodes with different sets of linkages).

Figure 1B:
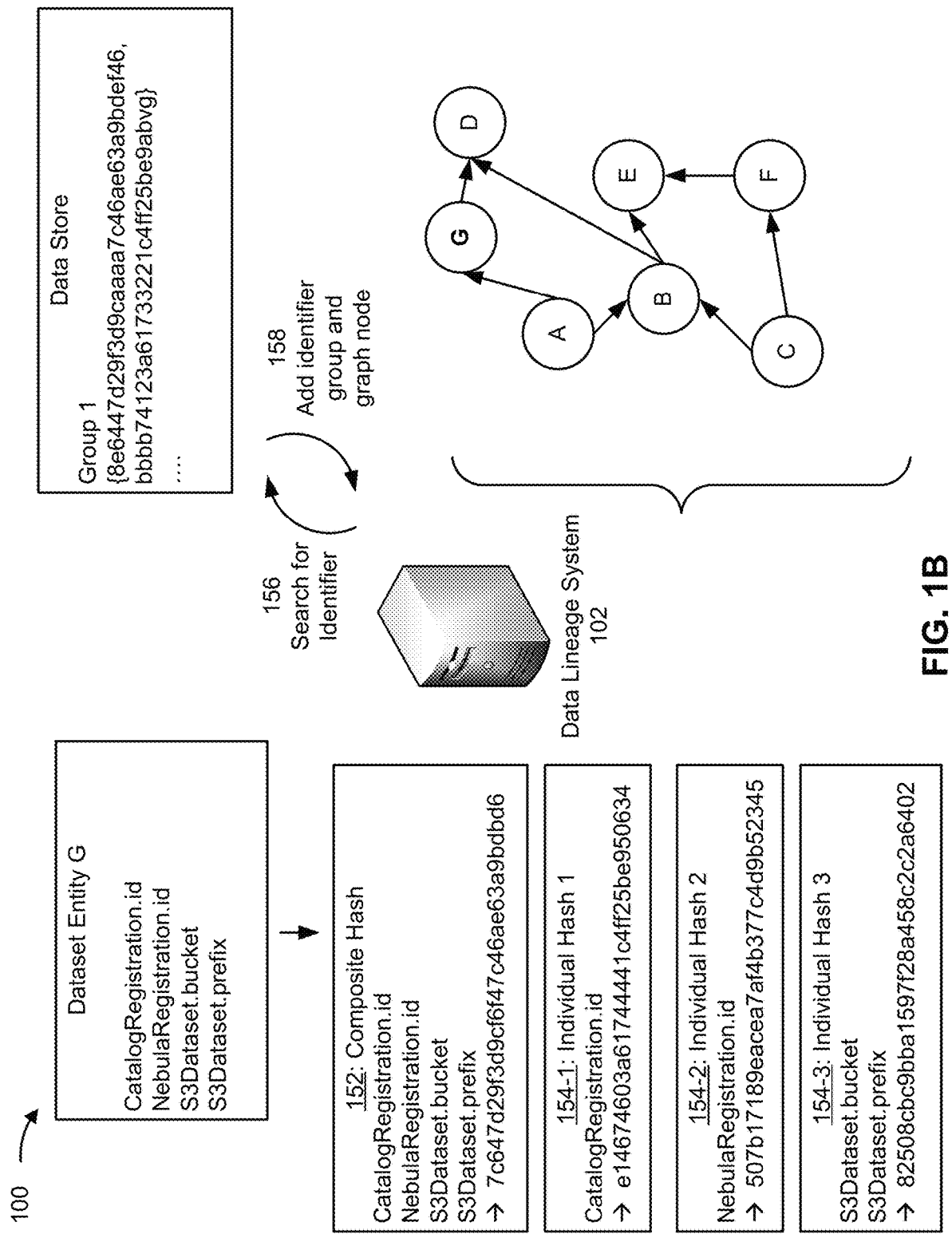
Figure 1C:
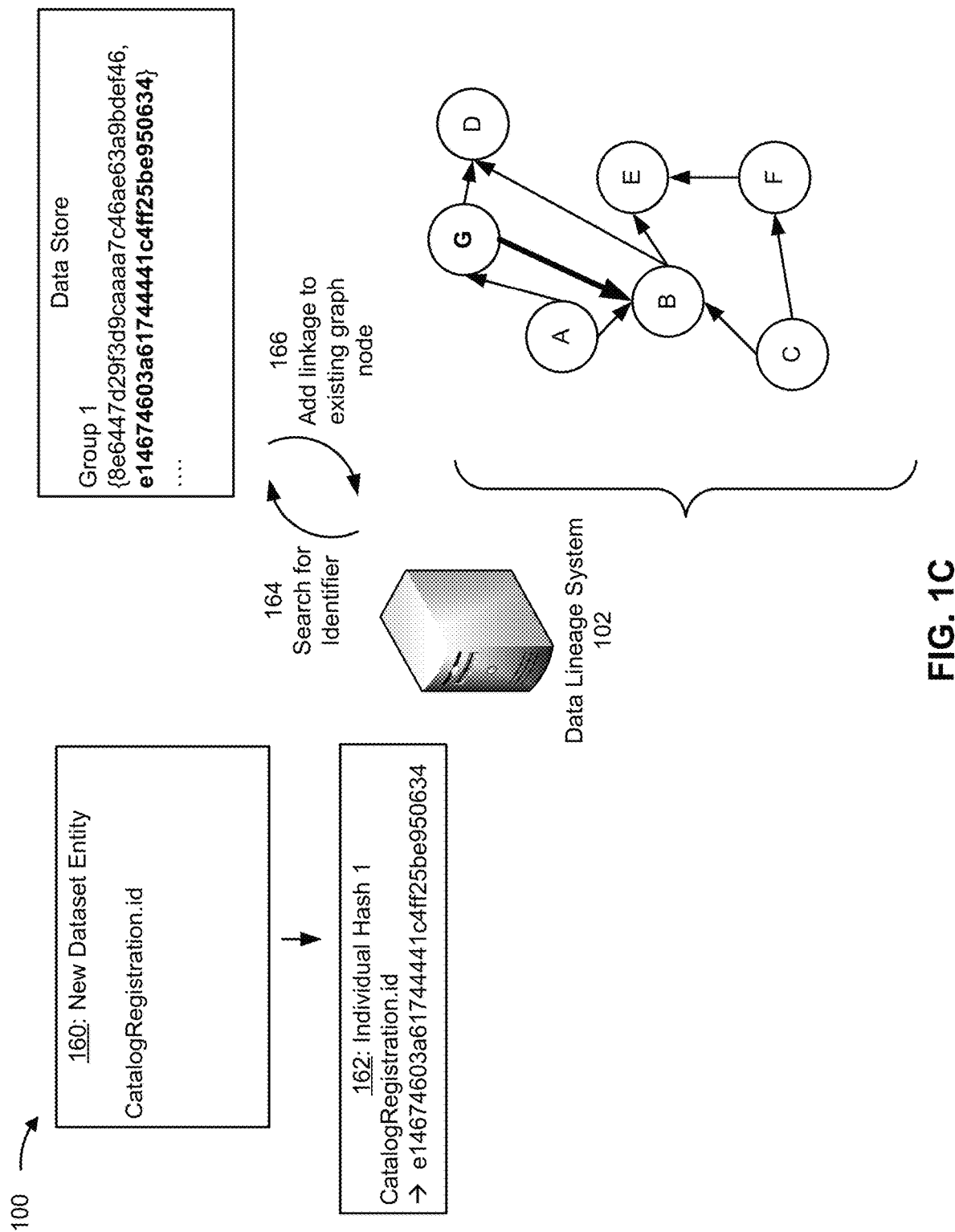

FIGS. 1A-1C are diagrams of an example implementation 100 associated with dataset identification for datasets with multiple identification attributes. As shown in FIGS. 1A-1C, example implementation 100 includes a data lineage system 102 and a client device 104. These devices are described in more detail below in connection with FIG. 2 and FIG. 3.

As further shown in FIG. 1A, and by reference number 150, the data lineage system 102 may receive information identifying a data lineage event. For example, the data lineage system 102 may receive information identifying a data lineage event from the client device 104. Data lineage is a record of relationships between datasets and processes that interact with the datasets. For example, a data lineage event may describe a hop of data lineage that includes one or more datasets that are consumed as an input to a process (e.g., a software application) and one or more datasets that are generated as an output from the process. In an enterprise data lineage system, such as the data lineage system 102, the process can be modeled as an interconnection (e.g., a linkage or edge) between graph nodes (e.g., representing datasets) in a graph representation or graph database.

In some implementations, the data lineage system 102 may receive the information identifying the data lineage event based on receiving a submission from the client device 104. For example, when the client device 104 receives, generates, or otherwise adds a new process to a set of processes being performed in connection with an enterprise system, the client device 104 may transmit information identifying the process to the data lineage system 102. Additionally, or alternatively, when the client device 104 receives, generates, or otherwise adds a new dataset that can be interacted with by a process (e.g., input to or output from), the client device 104 may provide information identifying the dataset. In some implementations, the data lineage system 102 may receive the information identifying the data lineage event based at least in part on parsing information. For example, the data lineage system 102 may parse a database, a storage access log, or program code to identify one or more datasets and/or one or more processes interacting therewith.

As shown in FIG. 1B, and by reference number 152, the data lineage system 102 may generate a first identifier. For example, the data lineage system 102 may process, collectively, each unique identification attribute of a dataset (e.g., the dataset entity "G") to generate a composite identifier. Each dataset can be referenced using multiple, different, possible, unique identification attributes. For example, as shown, the dataset entity "G" can be referenced by a first identification attribute "CatalogRegistration.id," a second identification attribute "NebulaRegistration.id," or a set of third identification attributes "S3Datset.bucket" and "S3Dataset.prefix." When the data lineage system 102 receives information identifying a dataset, the information may include any or all of the unique identification attributes. In this case, the data lineage system 102 collectively processes all of the unique identification attributes to generate a composite identifier. For example, the data lineage system 102 may concatenate a set of strings representing the set of unique identification attributes and may process the concatenated set of strings. Additionally, or alternatively, the data lineage system 102 may combine the unique identifiers in a different manner, to form an input to a processing algorithm, than a concatenation operation. In some implementations, the data lineage system 102 may process the unique identification attributes using a hash function. For example, the data lineage system 102 may generate a hash of the concatenated set of strings as a composite identifier, which may also be referred to as an "entity identifier", for the dataset. Additionally, or alternatively, the data lineage system 102 may use a digest algorithm to process the unique identification attributes and generate a composite identifier.

As further shown in FIG. 1B, and by reference numbers 154-1 through 154-3, the data lineage system 102 may generate a set of second identifiers. For example, the data lineage system 102 may process, individually, the unique identification attributes of the dataset (e.g., the dataset entity "G") to generate a set of individual identifiers. In this case, the data lineage system 102 may apply the hash function or digest algorithm to generate the set of second identifiers, with each of the unique identification attributes corresponding to a second identifier, which may also be referred to as an "alias identifier" of the set of second identifiers. As further shown in FIG. 1B, and by reference numbers 156 and 158, the data lineage system 102 may search for the identifiers of the dataset and may add the identifiers of the dataset and a graph node for the dataset. For example, the data lineage system 102 may attempt to identify a group, within the data store, that includes an identifier of the dataset (e.g., the dataset entity "G") and, based on not identifying a group that includes an identifier of the dataset, the data lineage system 102 may add groups of identifiers to the datastore and a graph node to the graph. In this case, the data lineage system 102 may generate groups of identifiers (e.g., pairs or tuples) that each have a composite identifier (e.g., an entity identifier) and an individual identifier (e.g., an alias identifier). Additionally, or alternatively, when the data lineage system 102 generates a new graph node for the dataset, the data lineage system 102 identifies the graph node by the entity identifier. For example, the data lineage system 102 adds a graph node "G" and linkages that indicate that dataset "G" is an output of a first process, which had dataset "A" as input, and is an input to a second process, which had dataset "D" as an output. In this way, the data store maintains a record of each alias identifier that can pair with a particular entity identifier, which can be associated to a graph node in the graph representation.

As shown in FIG. 1C, and by reference number 160, the data lineage system 102 may receive a new dataset entity. For example, the data lineage system 102 may receive information identifying a new data lineage event, which may include information identifying a dataset associated with the new data lineage event. In this case, the information identifying the new data lineage event may include information identifying a unique identification attribute ("CatalogRegistration.id") of a potentially new dataset. As further shown in FIG. 1C, and by reference number 162, the data lineage system 102 may generate an identifier for the dataset associated with the new data lineage event. For example, the data lineage system 102 may process a unique identification attribute by which the dataset is identified to generate an identifier of the dataset. In other words, the parameter "CatalogRegistration.id" is used to identify the new dataset entity and the data lineage system 102 hashes the parameter "CatalogRegistration.id" to generate a hash value. Additionally, or alternatively, the parameter "CatalogRegistration.id" can be used to generate another type of unique value (or other type of value) using another type of function. In this case, the data lineage system 102 can use the hash value to determine whether the new dataset identified in the new data lineage event is actually new or has already been encountered by the data lineage system 102 and added to the graph representation.

As further shown in FIG. 1C, and by reference number 164, the data lineage system 102 may search for the generated identifier in the data store. For example, the data lineage system 102 may determine whether the generated hash value is included in a group of the data store. In this case, as shown, the data lineage system 102 may determine that the generated hash value is an individual identifier present in group 1 of the data store and may identify a collective identifier (e.g., another hash value) associated with the individual identifier. In other words, group 1 includes collective identifier "8e64 . . . ", described above, and individual identifier "e146 . . . ". In this case, the data lineage system 102 may use the collective identifier, which is paired with the individual identifier, to determine a graph node "G" that has already been generated for the dataset entity (e.g., when the dataset entity was previous encountered and added to the graph representation). As further shown in FIG. 1C, the data lineage system 102 may add a linkage to an existing graph node. For example, based on identifying the graph node "G" that corresponds to the dataset, the data lineage system 102 may forgo adding a new graph node and, instead, add a new linkage to an existing graph node (e.g., from graph node "G" to graph node "B") associated with the new data lineage event, thereby updating the graph representation. In this case, the new linkage indicates that dataset "G" is an input to a process that generates dataset "B" as an output (in addition to the previous lineage event that identified dataset "G" as an output of a first process, which had dataset "A" as input, and as an input to a second process, which had dataset "D" as an output).

In some implementations, the data lineage system 102 may perform an action based on updating the graph representation. For example, the data lineage system 102 may receive a request for information regarding a dataset and may traverse the graph representation to identify a dataset within the graph representation and output information identifying linkages to the dataset. In this case, the data lineage system 102 may use the information identifying linkages to the set dataset to, for example, automatically evaluate whether a code update will cause errors (e.g., by breaking one or more linkages). Additionally, or alternatively, the data lineage system 102 may use the information identifying linkages to alter the execution of one or more processes. For example, when the data lineage system 102 determines that there are multiple execution paths or a request (e.g., multiple sets of executed processes that result in the same final dataset), the data lineage system 102 can automatically execute an execution path (e.g., a particular set of executed processes) with a lowest resource utilization (e.g., a lowest processor utilization) to obtain the requested final dataset. In this case, by having a graph representation without duplicates, the data lineage system 102 can identify the multiple execution paths resulting in the same final dataset.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
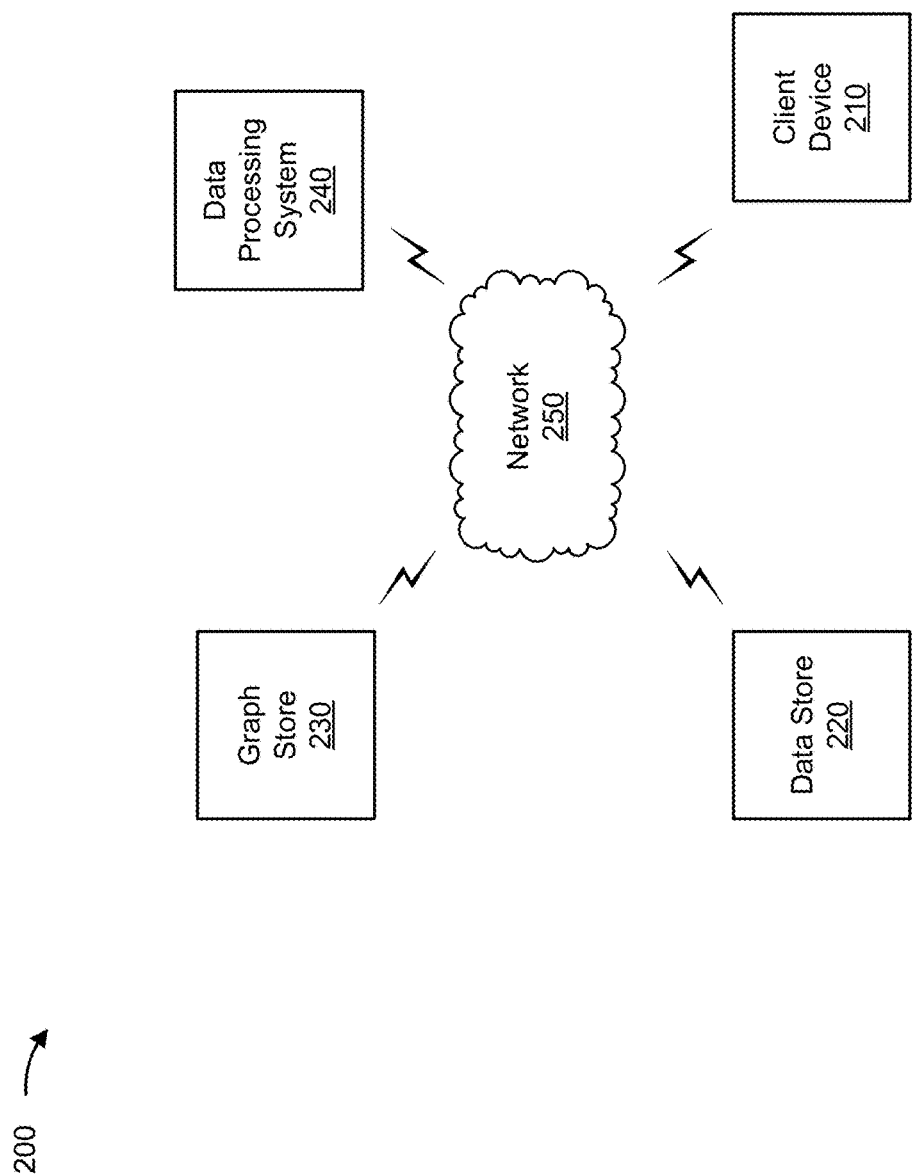
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a client device 210, a data store 220, a graph store 230, a data processing system 240, and a network 250. Devices of environment 200 may interconnect via wired connections, wireless connections, or a combination of wired and wireless connections.

The client device 210 may include one or more devices capable of receiving, generating, storing, processing, and/or providing information associated with dataset identification for datasets with multiple identification attributes, as described elsewhere herein. The client device 210 may include a communication device and/or a computing device. For example, the client device 210 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The data store 220 may include one or more devices capable of receiving, generating, storing, processing, and/or providing information associated with datasets in a data lineage environment, as described elsewhere herein. For example, the data store 220 may provide one or more datasets and/or information regarding the one or more datasets. The data store 220 may include a communication device and/or a computing device. For example, the data store 220 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data store 220 may communicate with one or more other devices of environment 200, as described elsewhere herein.

The graph store 230 may include one or more devices capable of receiving, generating, storing, processing, and/or providing information associated with graph representations of data in a data lineage environment, as described elsewhere herein. For example, the graph store 230 may provide information associated with a graph representation of datasets. The graph store 230 may include a communication device and/or a computing device. For example, the graph store 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The graph store 230 may communicate with one or more other devices of environment 200, as described elsewhere herein.

The data processing system 240 may include one or more devices capable of receiving, generating, storing, processing, providing, and/or routing information associated with a graph representation of datasets in a data lineage environment, as described elsewhere herein. For example, the data processing system 240 may correspond to the data lineage system 102 of FIGS. 1A-1C. The data processing system 240 may include a communication device and/or a computing device. For example, the data processing system 240 may include a server, such as an application server, a client server, a web server, a database server, a host server, a proxy server, a virtual server (e.g., executing on computing hardware), or a server in a cloud computing system. In some implementations, the data processing system 240 may include computing hardware used in a cloud computing environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
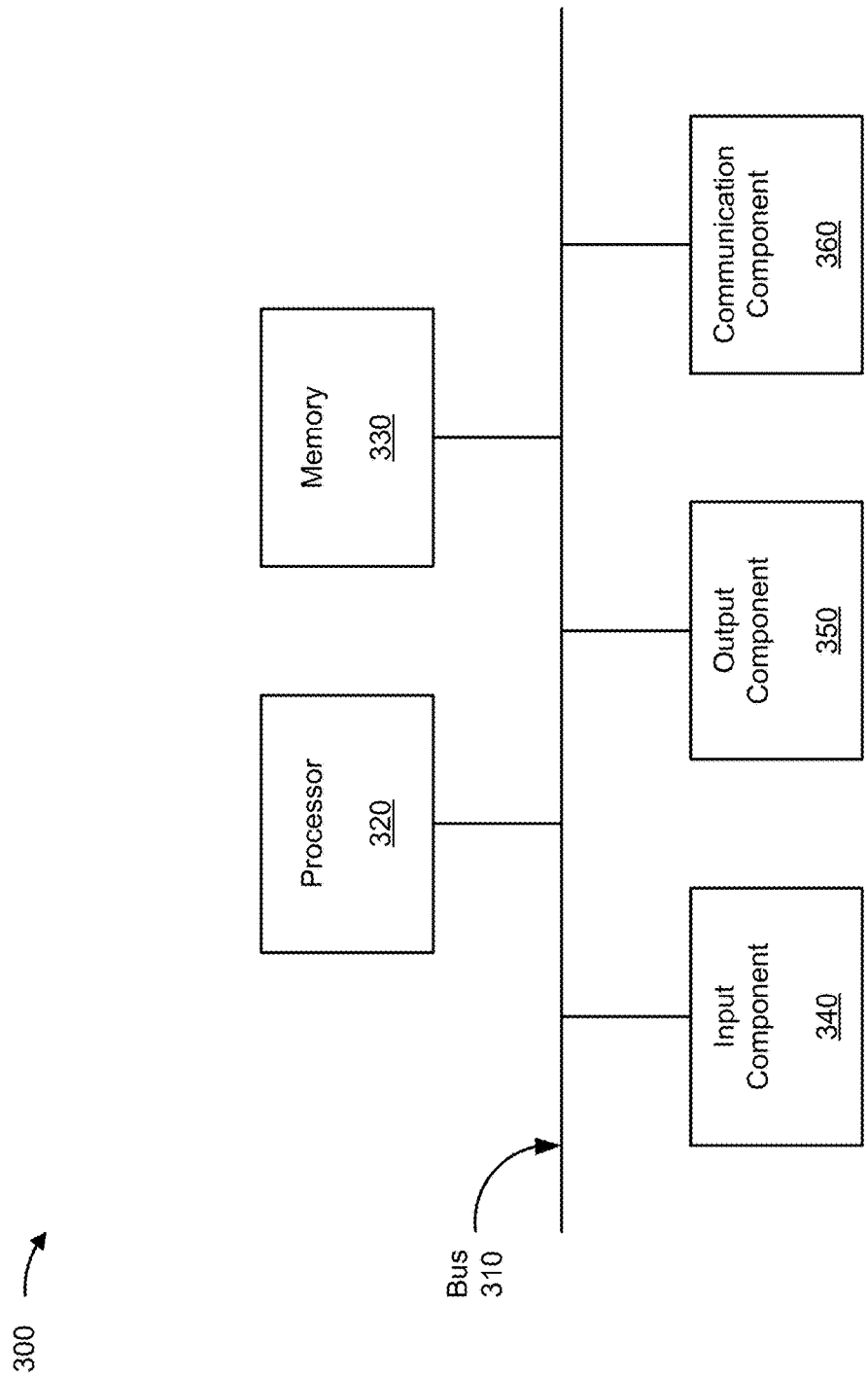
FIG. 3 is a diagram of example components of a device associated with dataset identification for datasets, in accordance with some embodiments of the present disclosure.

FIG. 3 is a diagram of example components of a device 300 associated with dataset identification for datasets. The device 300 may correspond to client device 210, data store 220, graph store 230, and/or data processing system 240. In some implementations, client device 210, data store 220, graph store 230, and/or data processing system 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory).

The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
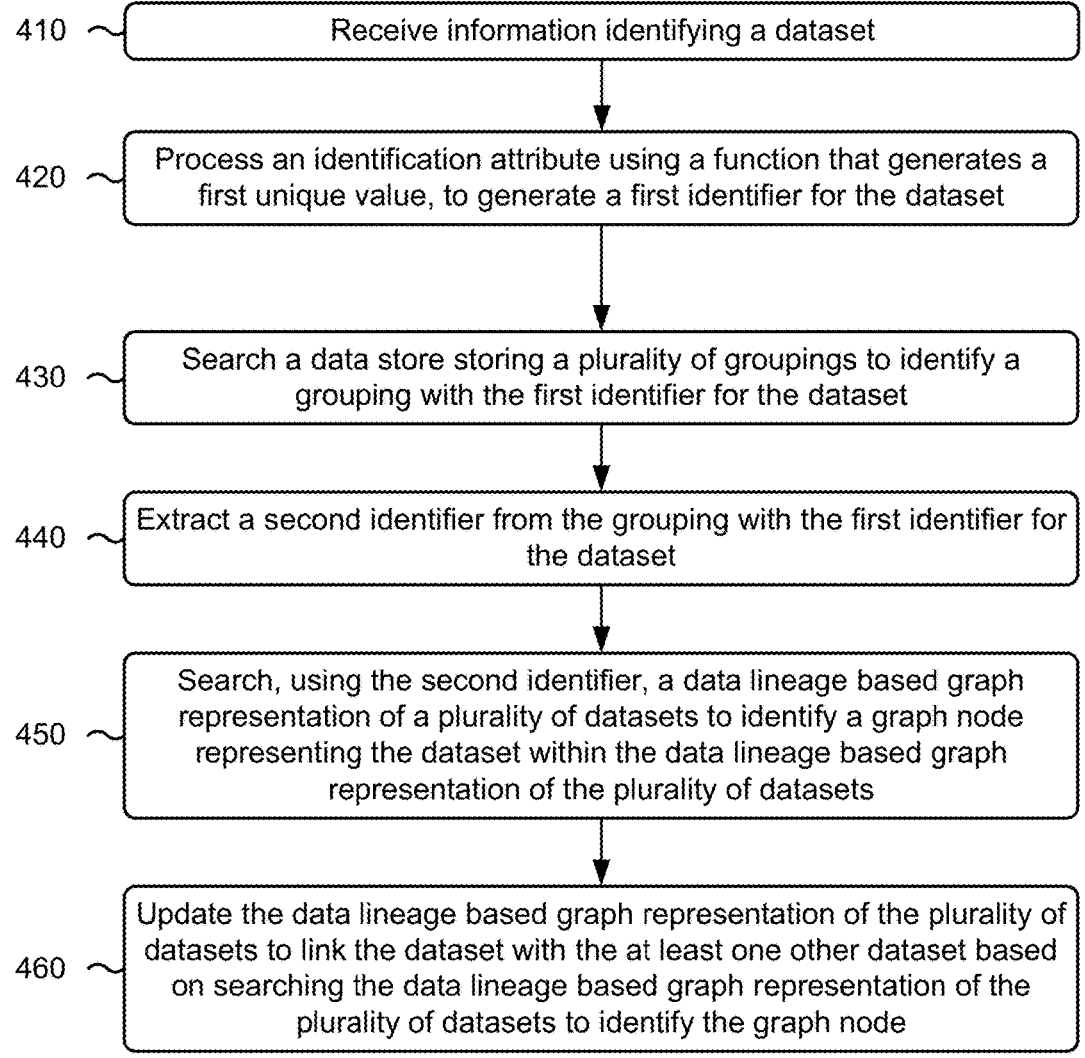
FIG. 4 is a flowchart of an example process associated with dataset identification for datasets with multiple identification attributes, in accordance with some embodiments of the present disclosure.

FIG. 4 is a flowchart of an example process 400 associated with dataset identification for datasets with multiple identification attributes. In some implementations, one or more process blocks of FIG. 4 may be performed by the data processing system 240. In some implementations, one or more process blocks of FIG. 4 may be performed by another device or a group of devices separate from or including the data processing system 240, such as the client device 210, the data store 220, and/or the graph store 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving information identifying a dataset, wherein the information identifying the dataset includes information identifying at least one other dataset linked to the data by a process (block 410). For example, the data processing system 240 (e.g., using processor 320, memory 330, input component 340, and/or communication component 360) may receive information identifying a dataset, as described above in connection with reference number 160 of FIG. 1C. In some implementations, the information identifying the dataset includes information identifying at least one other dataset linked to the data by a process. As an example, the data processing system 240 may receive information identifying a dataset, which is an input to a process, with an identification attribute.

As further shown in FIG. 4, process 400 may include processing an identification attribute using a function that generates a first unique value, to generate a first identifier for the dataset (block 420). For example, the data processing system 240 (e.g., using processor 320 and/or memory 330) may process an identification attribute using a function that generates a first unique value, to generate a first identifier for the dataset, as described above in connection with reference number 162 of FIG. 1C. As an example, the data processing system 240 may generate a hash of the identification attribute.

As further shown in FIG. 4, process 400 may include searching a data store storing a plurality of groupings to identify a grouping with the first identifier for the dataset (block 430). For example, the data processing system 240 (e.g., using processor 320 and/or memory 330) may search a data store storing a plurality of groupings to identify a grouping with the first identifier for the dataset, as described above in connection with reference number 164 of FIG. 1C. As an example, the data processing system 240 may search the data store to determine whether the hash of the identification attribute is present in a grouping of the data store.

As further shown in FIG. 4, process 400 may include extracting a second identifier from the grouping with the first identifier for the dataset (block 440). For example, the data processing system 240 (e.g., using processor 320 and/or memory 330) may extract a second identifier from the grouping with the first identifier for the dataset, as described above in connection with reference number 166 of FIG. 1C. As an example, based on finding the hash of the identification attribute in the data store, the data processing system 240 may identify another hash in the data store and use the other hash to identify a graph node in a graph, as described below.

As further shown in FIG. 4, process 400 may include searching, using the second identifier, a data lineage based graph representation of a plurality of datasets to identify a graph node representing the dataset within the data lineage based graph representation of the plurality of datasets (block 450). For example, the data processing system 240 (e.g., using processor 320 and/or memory 330) may search, using the second identifier, a data lineage based graph representation of a plurality of datasets to identify a graph node representing the dataset within the data lineage based graph representation of the plurality of datasets, as described above in connection with reference number 166 of FIG. 1C. As an example, based on finding the hash of the identification attribute in the data store, the data processing system 240 may identify another hash in the data store and use the other hash to identify a graph node in a graph.

As further shown in FIG. 4, process 400 may include updating the data lineage based graph representation of the plurality of datasets to link the dataset with the at least one other dataset based on searching the data lineage based graph representation of the plurality of datasets to identify the graph node (block 460). For example, the data processing system 240 (e.g., using processor 320 and/or memory 330) may update the data lineage based graph representation of the plurality of datasets to link the dataset with the at least one other dataset based on searching the data lineage based graph representation of the plurality of datasets to identify the graph node, as described above in connection with reference number 166 of FIG. 1C. As an example, the data processing system 240 may add a linkage to an existing graph node in the graph.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for lineage-driven dataset identification, the system comprising:
 one or more memories; and
 one or more processors, communicatively coupled to the one or more memories, configured to:
 receive information identifying a dataset with a plurality of identification attributes;
 process the plurality of identification attributes, collectively, using a first function that generates a first value, to generate a first identifier for the dataset;

process the plurality of identification attributes, individually, using a second function that generates a plurality of second values, to generate a plurality of second identifiers for the dataset;

generate, based on processing the plurality of identification attributes collectively and individually, a plurality of groupings, wherein each grouping, of the plurality of groupings, includes the first identifier and a corresponding second identifier of the plurality of second identifiers;

add a graph node, for the dataset, to a data lineage based graph representation of a plurality of datasets, wherein the graph node is associated with the first identifier; and store, in a data store associated with the data lineage based graph representation of the plurality of datasets, information identifying the plurality of groupings.

2. The system of claim 1, wherein the one or more processors are further configured to:

process at least one identification attribute, of the plurality of identification attributes, using a third function that generates a third value, to generate a third identifier, the third function being the first function or the second function; and determine that the third identifier is not included in any grouping of the data store; and wherein adding the graph node to the data lineage based graph representation of the plurality of datasets comprises:

adding the graph node to represent the dataset based on determining that the third identifier is not included in any grouping of the data store.

3. The system of claim 1, wherein the one or more processors are further configured to:

process at least one identification attribute, of the plurality of identification attributes, using a third function that generates a third value, to generate a third identifier, the third function being the first function or the second function;

determine that the third identifier is included in at least one grouping of the data store, the at least one grouping linking to the graph node; and forgo adding another graph node for the dataset based on determining that the third identifier is included in at least one grouping of the data store.

4. The system of claim 1, wherein the first function or the second function includes at least one of:

a hash function, or a digest algorithm.

5. The system of claim 1, wherein an identification attribute, of the plurality of identification attributes, includes a first component and a second component.

6. The system of claim 5, wherein the one or more processors, to process the plurality of identification attributes individually, are configured to:

process a combination of the first component and the second component to process the identification attribute.

7. The system of claim 1, wherein the one or more processors are further configured to:

receive information identifying a lineage event, the lineage event including information identifying one or more datasets input to a process and one or more datasets output from the process; and wherein the one or more processors, when configured to receive the information identifying the dataset, are configured to:

identify the dataset from the one or more datasets input to the process or the one or more datasets output from the process.

8. The system of claim 7, wherein the one or more processors, to add the graph node, are configured to:

generate one or more linkages between the graph node and one or more other graph nodes of the data lineage based graph representation, the one or more linkages representing the process and the one or more other graph nodes representing at least one other dataset of the one or more datasets input to the process or the one or more datasets output from the process.

9. A method for lineage-driven dataset identification, comprising:

receiving, by a system, information identifying a dataset, wherein the information includes:

an identification attribute that identifies the dataset, and other information identifying at least one other dataset linked to the dataset by a process;

processing, by the system, the identification attribute using a function that generates a first value, to generate a first identifier for the dataset;

searching, by the system, a data store storing a plurality of groupings to identify a grouping with the first identifier for the dataset;

extracting, by the system, a second identifier from the grouping with the first identifier for the dataset;

searching, by the system and using the second identifier, a data lineage based graph representation of a plurality of datasets to identify a graph node representing the dataset within the data lineage based graph representation of the plurality of datasets;

updating, by the system, the data lineage based graph representation of the plurality of datasets to link the dataset with the at least one other dataset based on searching the data lineage based graph representation of the plurality of datasets to identify the graph node;

processing another identification attribute of the at least one other dataset to generate a third identifier of the at least one other dataset;

determining, based on a search of the data store to identify another grouping with the third identifier of the at least one other dataset, that the at least one other dataset is not represented in the data lineage based graph representation; and adding, based on determining that the at least one other dataset is not represented in the data lineage based graph representation, at least one grouping to the data store to correspond to the third identifier of the at least one other dataset.

10. The method of claim 9, further comprising:

searching the data store to identify another grouping with the third identifier of the at least one other dataset;

extracting a fourth identifier from the other grouping; and searching, using the fourth identifier, the data lineage based graph representation to identify another graph node representing the at least one other dataset; and wherein updating the data lineage based graph representation comprises:

linking the graph node with the other graph node.

11. The method of claim 9, wherein updating the data lineage based graph representation comprises:

generating a new graph node for the at least one other dataset; and linking the graph node with the new graph node.

12. The method of claim 9, wherein the function includes at least one of:

a hash function, or a digest algorithm.

13. The method of claim 9, wherein the identification attribute includes a first component and a second component.

14. The method of claim 13, wherein processing the identification attribute comprises:

processing a combination of the first component and the second component to process the identification attribute.

15. The method of claim 14, wherein processing the combination of the first component and the second component comprises:

concatenating a first string representing the first component and a second string representing the second component to generate a concatenated string; and processing the concatenated string.

16. The method of claim 9, wherein the system uses a hash function to generate the first identifier.

17. A non-transitory computer-readable medium storing a set of instructions, the set of instructions comprising:

one or more instructions that, when executed by one or more processors of a system, cause the system to:

receive information identifying a dataset with a plurality of identification attributes;

process the plurality of identification attributes, collectively, using a first function that generates a first value, to generate a first identifier for the dataset;

process the plurality of identification attributes, individually, using a second function that generates a plurality of second values, to generate a plurality of second identifiers for the dataset;

generate, based on processing the plurality of identification attributes collectively and individually, a plurality of groupings, wherein each grouping, of the plurality of groupings, includes the first identifier and a corresponding second identifier of the plurality of second identifiers;

add a graph node, for the dataset, to a data lineage based graph representation of a plurality of datasets, wherein the graph node is associated with the first identifier;

store, in a data store associated with the data lineage based graph representation of the plurality of datasets, information identifying the plurality of groupings;

receive information identifying a lineage event, wherein the information identifying the lineage event includes at least one identification attribute of the plurality of identification attributes;

process the at least one identification attribute using a third function to generate a third identifier;

search the data store to identify at least one grouping that includes the third identifier;

identify a node in the data lineage based graph representation using the at least one grouping; and update the data lineage based graph representation based on the lineage event.

18. The non-transitory computer-readable medium of claim 17, wherein the one or more instructions further cause the system to:

determine that the first identifier or the plurality of second identifiers are not included in any grouping of the data store; and wherein the one or more instructions, that cause the system to add the graph node to the data lineage based graph representation of the plurality of datasets, cause the system to:

add the graph node to represent the dataset based on determining that the first identifier or the plurality of second identifiers are not included in any grouping of the data store.

19. The non-transitory computer-readable medium of claim 17, wherein the one or more instructions further cause the system to:

determine that the first identifier or a second identifier of the plurality of second identifiers is included in at least one grouping of the data store, the at least one grouping linking to the graph node; and forgo adding another graph node for the dataset based on determining that the first identifier or the second identifier of the plurality of second identifiers is included in the at least one grouping of the data store.

20. The non-transitory computer-readable medium of claim 17, wherein the first function or the second function includes at least one of:

a hash function, or a digest algorithm.

* * * * *